(12) United States Patent
Zhang et al.

(10) Patent No.: US 11,872,556 B2
(45) Date of Patent: Jan. 16, 2024

(54) GENERAL-PURPOSE FLUORESCENT FLUID PHOTOCHEMICAL MICROREACTOR AND MANUFACTURING METHOD THEREFOR BY 3D PRINTING

(71) Applicant: DALIAN UNIVERSITY OF TECHNOLOGY, Liaoning (CN)

(72) Inventors: Lijing Zhang, Liaoning (CN); Shengyang Tao, Liaoning (CN); Zhigang Zhu, Liaoning (CN); Wenbo Yang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 689 days.

(21) Appl. No.: 17/054,051

(22) PCT Filed: Mar. 5, 2019

(86) PCT No.: PCT/CN2019/076906
§ 371 (c)(1),
(2) Date: Nov. 9, 2020

(87) PCT Pub. No.: WO2020/177065
PCT Pub. Date: Sep. 10, 2020

(65) Prior Publication Data
US 2021/0101145 A1    Apr. 8, 2021

(51) Int. Cl.
*B29C 64/135* (2017.01)
*B01L 3/00* (2006.01)
(Continued)

(52) U.S. Cl.
CPC ..... *B01L 3/502715* (2013.01); *B01J 19/0093* (2013.01); *B01L 13/00* (2019.08);
(Continued)

(58) Field of Classification Search
CPC .......... B01J 19/0093; B01J 2219/00934; B01J 2219/00792; B01J 2219/00943;
(Continued)

(56) References Cited

U.S. PATENT DOCUMENTS

| 2015/0010445 A1* | 1/2015 | Makatsoris | ................ B01J 8/06 422/198 |
| 2016/0051941 A1* | 2/2016 | Li | .......................... B01D 69/06 96/4 |

(Continued)

FOREIGN PATENT DOCUMENTS

| CN | 103301796 A | 9/2013 |
| CN | 104028188 A | 9/2014 |

(Continued)

OTHER PUBLICATIONS

Yao, Xingjun et al., "Review of the applications of microreactors", Renewable and Sustainable Energy Reviews, Mar. 30, 2015, vol. 47, pp. 519-539, Elseviers Science, New York, NY, US, (XP-055731325), (ISSN:1364-0321).

(Continued)

*Primary Examiner* — Monica A Huson
(74) *Attorney, Agent, or Firm* — Muncy, Geissler, Olds & Lowe, P.C.

(57) ABSTRACT

Disclosed are a general-purpose fluorescent fluid photochemical microreactor and a manufacturing method therefor by means of 3D printing, belonging to the technical field of photochemical reactor research. By using a transparent photosensitive resin and the strong space building capacity of 3D printing, a photochemical microreactor having both a light-collecting channel and a reaction channel is prepared. By means of introducing a light-collecting substance in a fluid form into a light channel, not only can play the role of light collection and wavelength conversion, which solves the difficulty of traditional photochemical reactors of light (Continued)

source matching, but also the light-collecting substance can be flexibly changed so as to meet the requirements of different photochemical reactions in the reaction channel, which greatly expands the application range of the reactor.

7 Claims, 1 Drawing Sheet

(51) Int. Cl.
*B33Y 10/00* (2015.01)
*B33Y 80/00* (2015.01)
*B01J 19/00* (2006.01)
*B33Y 40/20* (2020.01)
*B33Y 70/00* (2020.01)
*B82Y 30/00* (2011.01)

(52) U.S. Cl.
CPC ............ *B29C 64/135* (2017.08); *B33Y 10/00* (2014.12); *B33Y 40/20* (2020.01); *B33Y 80/00* (2014.12); *B01J 2219/00943* (2013.01); *B01L 2300/0867* (2013.01); *B01L 2300/0877* (2013.01); *B01L 2300/0883* (2013.01); *B33Y 70/00* (2014.12); *B82Y 30/00* (2013.01)

(58) Field of Classification Search
CPC .... B01J 2219/00795; B01J 2300/0883; B33Y 80/00; B33Y 10/00; B33Y 40/20; B33Y 70/00; B29C 64/135; B01L 13/00; B01L 3/502715; B01L 2300/0867; B01L 3/502707; B01L 2300/0877; G02B 6/42; B82Y 30/00
See application file for complete search history.

(56) References Cited

U.S. PATENT DOCUMENTS

| | | | |
|---|---|---|---|
| 2017/0151537 A1* | 6/2017 | De Malsche | ........... B01F 25/23 |
| 2019/0119242 A1* | 4/2019 | Ishihara | ................ B01J 19/123 |
| 2019/0240658 A1* | 8/2019 | Rajaraman | ............. B81B 1/006 |
| 2022/0032260 A1* | 2/2022 | Kim | ..................... B01J 19/0093 |
| 2022/0296221 A1* | 9/2022 | Garcia Cordero | ... G01N 33/689 |
| 2023/0117674 A1* | 4/2023 | Kim | .................. B01L 3/502707 |
| | | | 422/502 |

FOREIGN PATENT DOCUMENTS

| | | | | |
|---|---|---|---|---|
| CN | 204768602 U | | 11/2015 | |
| CN | 107253961 A | | 10/2017 | |
| CN | 207401491 U | | 5/2018 | |
| CN | 108786678 | * | 11/2018 | .......... B01J 19/0093 |
| CN | 108786687 A | | 11/2018 | |
| IN | 202041000051 | * | 7/2021 | ........... B01L 113/00 |
| JP | 2004-233114 A | | 8/2004 | |
| JP | 2005-279493 A | | 10/2005 | |

OTHER PUBLICATIONS

Zou, Shibo, "Rapid Manufacturing of Microreactor for Chemical Synthesis Based on 3D Printing", Chinese Master's Theses Full-Text Database, Medicine & Health Sciences, Dec. 15, 2015, 69 pages (XP-055731322), (ISSN:1674-02460).

Li, Yifang et al., "Real-time spectroscopic monitoring of photocatalytic activity promoted by graphene in a microfluidic reactor", Scientific Reports, Jun. 27, 2016, vol. 6, 9 pages (XP-055731316), (ISSN 2045-2322).

* cited by examiner

GENERAL-PURPOSE FLUORESCENT FLUID PHOTOCHEMICAL MICROREACTOR AND MANUFACTURING METHOD THEREFOR BY 3D PRINTING

TECHNICAL FIELD

The present invention belongs to the technical field of photochemical reactor research, which relates to a 3D printing fluorescent fluid photochemical microreactor. Specifically, it relates to a method of using transparent light-curable resin 3D printing to manufacture microreactors with wavelength conversion function and can be applied to different photochemical reactions.

BACKGROUND

Photochemical reaction refers to the chemical reaction process that occurs under the irradiation of an external light source. The photochemical reactor is the place where the photochemical reaction proceeds, and its performance plays an important role in the efficiency of the photochemical reaction. The type of light source, the geometry of the reactor and the mutual position between the reactor and light source are the key factors that directly affect the performance of the photochemical reactor. In recent years, microreactors have received extensive attention due to the great improvements in the mass and heat transfer processes, which can enable higher conversion and yields in the chemical reaction process. Microreactor usually refers to a micro-structured chemical reactor whose internal fluid channel or dispersion space is on the order of micrometers. The photochemical microreactor is prepared by combining the light-transmitting microreactor and the external irradiating light source, which can effectively improve the conversion rate and selectivity of the photochemical reaction. However, in photochemical reactions, due to the intrinsic limitation of the basic principle of quantum mechanics, the occurrence of the reaction is directly related to the wavelength of the external radiation source (especially chemical reactions excited by visible light). Therefore, light sources with different irradiation wavelengths are often required for different photochemical reactions. In reality, some light sources with particular wavelength are costly or hard to obtain, which severely restricts the progress of many photochemical reactions.

Fluorescent dyes and quantum dots often have the characteristics of broad wavelength absorption and narrow wavelength emission. These substances can generate a strong emission light of a certain wavelength by collecting excitation light of different wavelengths, thereby playing the functions of light collection and wavelength conversion. By using this feature, people can utilize low-cost LED or even sunlight to initiate photochemical reactions. At present, fluorescent light-concentrating microreactors are widely used, that is, fluorescent materials are dispersed into a transparent medium, and then constructed the microchannels by the method of mold-removing, the final microreactors are formed after curing treatment. In this reactor, the fluorescent material absorbs light from an external light source and emits fluorescence of the desired wavelength. The emitted fluorescence will be transmitted in the transparent medium in an optical waveguide mode and focused on the built-in microchannel, thereby promoting the efficiency of photochemical reaction in the microchannel. This type of reactor solves the problem of wavelength matching in the photochemical reaction process. However, this type of reactor has the following problems: First, for the fluorescent dye is doped into the reactor matrix at the beginning and cannot be separated, this type of reactor is only suitable for photochemical reactions excited by a certain wavelength; Second, the fluorescent dye replacement and recycling are difficult to achieve; Finally, the process of preparing the reactor by the mold-removing method is complicated and time-consuming, and it is difficult to design more complicated space structure. These factors lead to the high manufacturing cost of the fluorescence-concentrating photochemical microreactor, low universality, and greatly restricted application range. Therefore, it is very important to develop a novel light-concentrating photochemical microreactor that is simple to prepare and can be general used for all kinds of photochemical reactions excited by different wavelengths.

Since the fluorescent material enters the reactor medium by doping, it is fixed and cannot be replaced. If the fluorescent material is introduced into the microreactor in the form of a fluid, it is expected to solve the above-mentioned problems. 3D printing is an emerging additive manufacturing technology that can construct objects with complex spatial structures through layer-by-layer printing, and has the characteristics of rapid prototyping. With the help of the powerful space construction capabilities of 3D printing technology, a continuous flow photochemical microreactor with a light collection channel and a reactant channel can be processed and manufactured to form a universal photochemical microreactor with replaceable fluorescent fluid.

SUMMARY

The purpose of the present invention is to provide a method for preparing a universal fluorescent fluid photochemical microreactor by using 3D printing technology combined with fluorescent materials.

Technical Solution of the Present Invention

A general-purpose fluorescent fluid photochemical microreactor, includes light channel 2, reaction channel 1, output of light channel, input of light channel, output of reaction channel and input of reaction channel; the light channel 2 is filled with the fluorescent fluid, and two ports of the light channel 2 are sealed; the reaction channel 1 is filled with reactant solution, and the light channel 2 is located around the reaction channel 1 to ensure the occurrence of the photochemical reaction.

The reaction channel 1 and light channel 2 are both serpentine square tubes, and the light channel 2 are two sets, respectively arranged in parallel on the upper and lower sides of the reaction channel 1.

The reaction channel 1 is a line square tube, and the light channel 2 is a spiral round tube, which wraps around the outer circumference of the reaction channel 1.

The material of the general-purpose fluorescent fluid photochemical microreactor is transparent photosensitive resin 3.

The fluorescent material in the fluorescent fluid is fluorescent dye, fluorescent quantum dot or nanocrystal, and the solvent is water, ethanol, isopropanol, acetonitrile, ethyl acetate, N,N-dimethylformamide, toluene or dichloromethane.

A 3D printing manufacturing method for the general-purpose fluorescent fluid photochemical microreactor, comprises the steps as follows:

(1) Designing the model of the microreactor by using Solidworks software and printing it with a 3D printer.

The characteristic dimensions (i.e. tube diameter or cross-sectional side length) of light channel 2 and reaction channel 1 are 0.5-1 mm, and the material is transparent photosensitive resin 3.

(2) Printing the microreactor by a UV curing 3D printer.
(3) Cleaning the microreactor with a mixture of ethanol and isopropanol, and ensuring that there is no resin residue in the channel, and then placing it under a UV lamp to cure for 2-10 hours.
(4) Dissolving the fluorescent material in a solvent with a concentration of 0.1-1000 ppm, and then using a syringe to inject it into the light channel 2 and sealing the two ends tightly. Then, a general-purpose fluorescent fluid photochemical microreactor is prepared.

The layer printing accuracy selected by the 3D printer is 0.025-0.1 mm.

The beneficial effects of the invention: The invention adopts 3D printing technology to prepare a general-purpose fluorescent fluid photochemical microreactor, which provides simple and efficient equipment for the study of photochemical reactions. 1. The fabrication of the fluorescent fluid photochemical microreactor is very simple and low cost. 2. The fluorescent dye enters the light channel in the form of a fluid, and can be conveniently recycled after the reaction, avoiding the waste of fluorescent materials and environmental pollution, and also saving costs. 3. According to the light wavelength requirements of different reactions in the reaction channel, the types of fluorescent materials in the light channel can be flexibly changed, which greatly broadens the types of chemical reactions that occur in the reactor, and is more universal.

Figure 1:
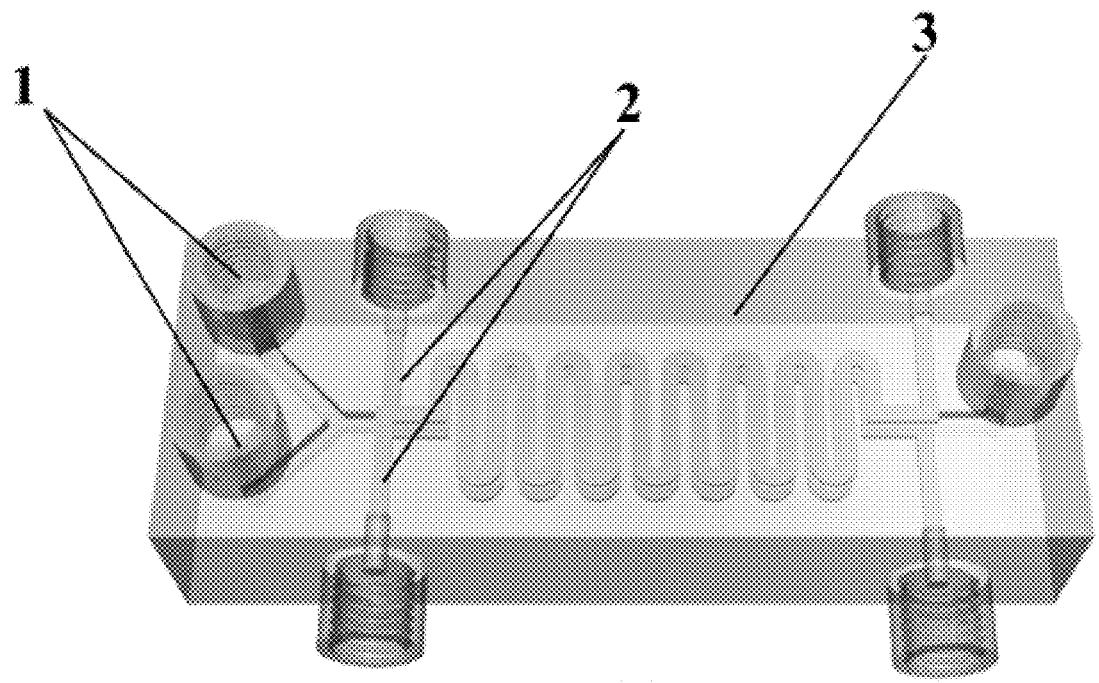
FIG. 1 is a schematic diagram of a serpentine fluorescent fluid photochemical microreactor.
Figure 2:
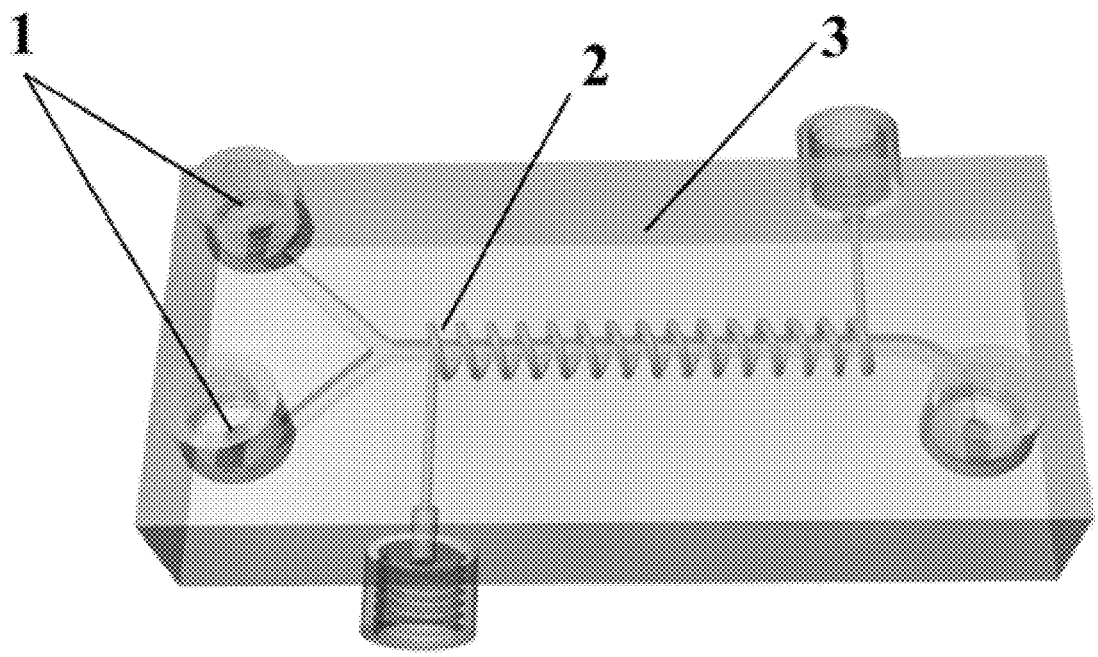
FIG. 2 is a schematic diagram of a spiral fluorescent fluid photochemical microreactor.

In Figures: 1 reaction channel; 2 light channel; 3 transparent photosensitive resin.

DETAILED DESCRIPTION

The present invention will be further described in detail below combined with the figures and technical solutions.

A method for preparing a general-purpose fluorescent fluid photochemical microreactor by using 3D printing technology, the specific steps are as follows:

Example 1 (Serpentine Microreactor)

(1) Design the model of the microreactor by using Solidworks software. Both the light microchannel and the reaction microchannel are serpentine square tubes with a side length of 1 mm and a channel length of 105 mm. The overall size of the reactor is 8.2 cm in length, 3 cm in width and 1.5 cm in height.
(2) Printed the microreactor by a UV curing 3D printer, its material is transparent photosensitive resin.
(3) After printing, remove the microreactor from the working platform and put it in a mixed solution of ethanol and isopropanol for cleaning. Pay special attention to cleaning the inside of the microchannel to ensure that there is no resin residue. Then placed the microreactor under a UV lamp and cured for 4 hours.
(4) The fluorescent dye Lumogen F Red 305 was dissolved in an ethanol solution at a concentration of 200 ppm, and it was injected into the light channel using a syringe.
(5) The fluorescent fluid photochemical microreactor is placed in a light-shielding cylinder wrapped with a blue LED light strip inside to form the final photochemical microreactor. For the catalytic oxidation of the diphenylanthracene, the reactants diphenylanthracene and the photocatalyst methylene blue can be injected into the reaction channel separately, and the oxidation conversion rate of the diphenylanthracene under the action of the fluorescent fluid is three times that of pure blue light.

Example 2 (Spiral Microreactor)

(1) Design the microreactor model by using SolidWorks software. The light microchannel is a spiral round tube with a tube diameter of 1 mm and a channel length of 105 mm. The reaction channel is a straight square tube with a side length of 1 mm and a channel length of 56 mm. The overall dimensions of the microreactor are 7 cm in length, 3.5 cm in width and 1.5 cm in height.
(2) Printed the microreactor by a UV curing 3D printer, its material is transparent photosensitive resin.
(3) After printing, remove the microreactor from the working platform and put it in a mixed solution of ethanol and isopropanol for cleaning. Pay special attention to cleaning the inside of the microchannel to ensure that there is no resin residue. Then placed the microreactor under a UV lamp and cured for 4 hours.
(4) The fluorescent dye fluorescein isothiocyanate (FITC) was dissolved in an ethanol solution at a concentration of 400 ppm, and injected into the light channel using a syringe.
(5) The fluorescent fluid photochemical microreactor is placed in a light-shielding cylinder wrapped with a blue LED light strip inside to form the final photochemical microreactor. For the oxidation reaction of p-methylthiophenol, the reactants p-methylthiophenol and the photocatalyst Eosin Y can be injected into the reaction channel separately, and the reaction conversion rate under the action of the fluorescent fluid is 1.8 times that of pure blue light.

The invention claimed is:

1. A 3D printing manufacturing method for general-purpose fluorescent fluid photochemical microreactor, wherein the microreactor comprises a light channel, a reaction channel, output of light channel, input of light channel, output of reaction channel and input of reaction channel; the light channel is filled with a fluorescent fluid, and two ports of the light channel are sealed; the reaction channel is filled with a reactant solution, and the light channel is located around the reaction channel to ensure an occurrence of a photochemical reaction;

the 3D printing manufacturing method comprises:
(1) designing a model of the microreactor and printing the microreactor with a 3D printer, a tube diameter or cross-sectional side length of the light channel and the reaction channel are 0.5-1 mm, and a material is transparent photosensitive resin;
(2) curing the microreactor by a UV light;
(3) cleaning the microreactor with a mixture of ethanol and isopropanol, and ensuring that there is no resin residue in the channel, and then placing the microreactor under a UV lamp to cure for 2-10 hours;

(4) dissolving a fluorescent material in a solvent with a concentration of 0.1-1000 ppm, and then using a syringe to inject the fluorescent material in the solvent into the light channel and sealing two ends of the light channel tightly to obtain the general-purpose fluorescent fluid photochemical microreactor.

2. The 3D printing manufacturing method for general-purpose fluorescent fluid photochemical microreactor according to claim 1, wherein the reaction channel and light channel are both serpentine square tubes, and two light channels respectively arranged in parallel on upper and lower sides of the reaction channel.

3. The 3D printing manufacturing method for general-purpose fluorescent fluid photochemical microreactor according to claim 1, wherein the reaction channel is a square tube, and the light channel is a spiral round tube, which wraps around an outer circumference of the reaction channel.

4. The 3D printing manufacturing method for general-purpose fluorescent fluid photochemical microreactor according to claim 1, wherein a material of the general-purpose fluorescent fluid photochemical microreactor is transparent photosensitive resin.

5. The 3D printing manufacturing method for general-purpose fluorescent fluid photochemical microreactor according to claim 1, the fluorescent material in the fluorescent fluid is fluorescent dye, fluorescent quantum dot or nanocrystal, and the solvent is water, ethanol, isopropanol, acetonitrile, ethyl acetate, N, N-dimethylformamide, toluene or dichloromethane.

6. The 3D printing manufacturing method for general-purpose fluorescent fluid photochemical microreactor according to claim 4, the fluorescent material in the fluorescent fluid is fluorescent dye, fluorescent quantum dot or nanocrystal, and the solvent is water, ethanol, isopropanol, acetonitrile, ethyl acetate, N, N-dimethylformamide, toluene or dichloromethane.

7. The 3D printing manufacturing method for the general-purpose fluorescent fluid photochemical microreactor according to claim 1, wherein a layer printing accuracy selected by the 3D printer is 0.025-0.1 mm.

* * * * *